United States Patent [19]

Balagurumurthy et al.

[11] Patent Number: 5,700,058

[45] Date of Patent: Dec. 23, 1997

[54] RETENTION FOR VEHICLE SEAT AND METHOD OF ASSEMBLY

[75] Inventors: Ravichandran Balagurumurthy, Dearborn Heights; Jon W. Kinsey, Ann Arbor, both of Mich.

[73] Assignee: Lear Corporation, Southfield, Mich.

[21] Appl. No.: 665,742

[22] Filed: Jun. 18, 1996

[51] Int. Cl.[6] ....................... B60N 2/20
[52] U.S. Cl. .................. 297/440.15; 297/378.1; 297/463.1; 297/232; 296/63
[58] Field of Search ............ 297/378.1, 378.12, 297/440.15, 440.2, 463.1, 232; 296/63, 65

[56] References Cited

U.S. PATENT DOCUMENTS

| | | |
|---|---|---|
| 2,732,003 | 1/1956 | Williams . |
| 3,262,737 | 7/1966 | Martens . |
| 4,143,913 | 3/1979 | Rumpf . |
| 4,572,569 | 2/1986 | Hassmann ............... 296/65.1 |
| 4,708,385 | 11/1987 | Kondo ...................... 296/65.1 |
| 4,771,507 | 9/1988 | Draplin et al. . |
| 4,958,877 | 9/1990 | Lezotte et al. ........... 297/378.1 X |
| 5,263,763 | 11/1993 | Billette ....................... 296/63 |
| 5,273,336 | 12/1993 | Schubring et al. ......... 297/378.1 |
| 5,340,195 | 8/1994 | Notta . |
| 5,498,054 | 3/1996 | Tomlinson ............... 297/378.1 X |
| 5,540,481 | 7/1996 | Roossien et al. ......... 297/300.4 |

Primary Examiner—Peter R. Brown
Attorney, Agent, or Firm—Howard & Howard

[57] ABSTRACT

A folding backrest for a passenger seat assembly in a motor vehicle comprises a backrest frame having a first end and a second end. First and second hinges pivotally support the respective first and second ends of the backrest frame about an imaginary horizontal folding axis for movement between a use position and a folded position. A pivot beating is formed in an tab extending from the first end of the backrest frame. A self-locking plastic bushing is positioned in the pivot beating. The pivot bearing and bushing together form a keyway having a pair of diametrically opposing notches. A floor bracket made of mirror-image right and left half sections retain a hinge pin in a perpendicularly extending fashion by sandwiching therebetween a central flange of the hinge pin. The hinge pin includes a keyed tip which is aligned and registerable with the keyway when the backrest frame is in the folded position to permit axial sliding connection between the pivot bearing and the hinge pin during the assembly process. The keyed tip and the keyway are rotated out of registry with one another when the backrest frame is in the use position to prevent disassembly during high impact forces.

19 Claims, 2 Drawing Sheets

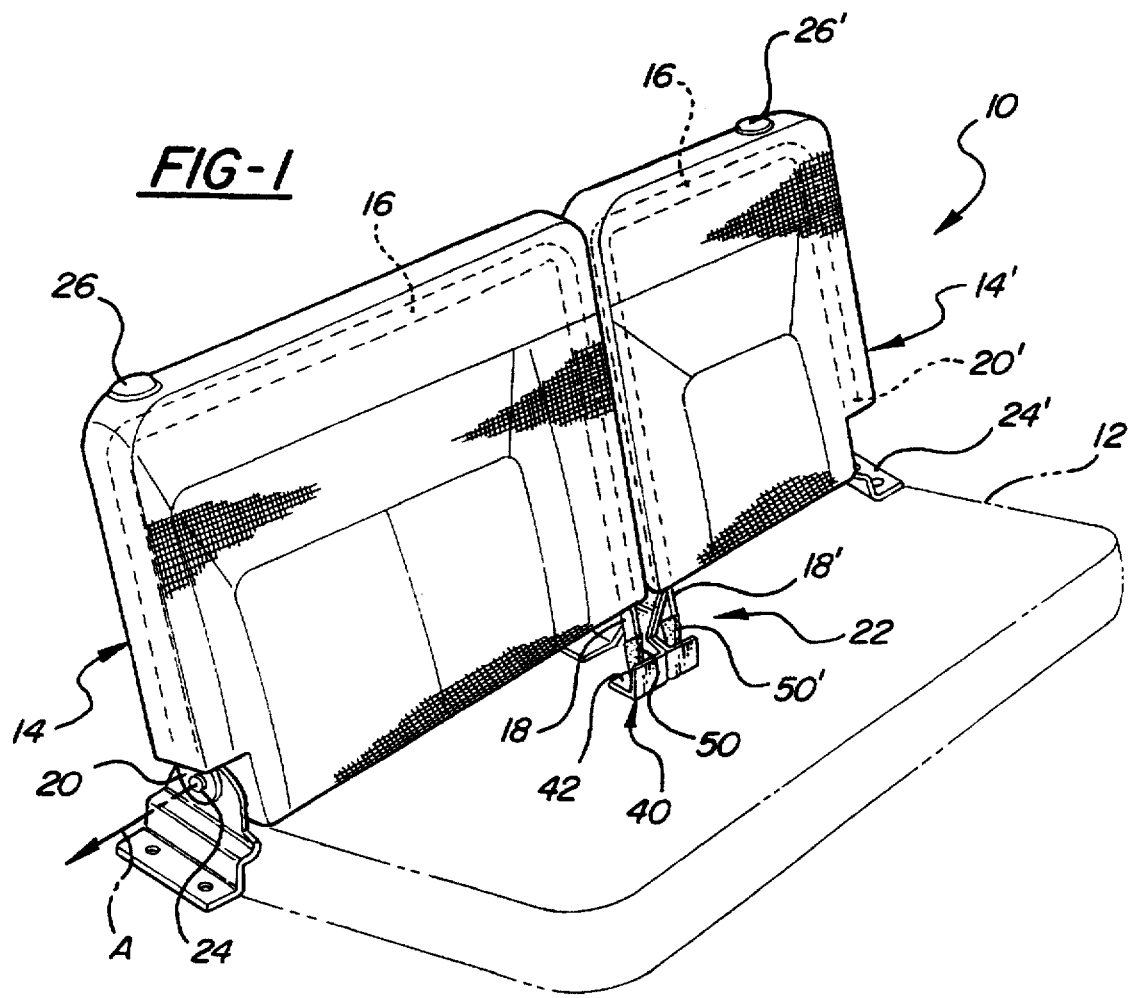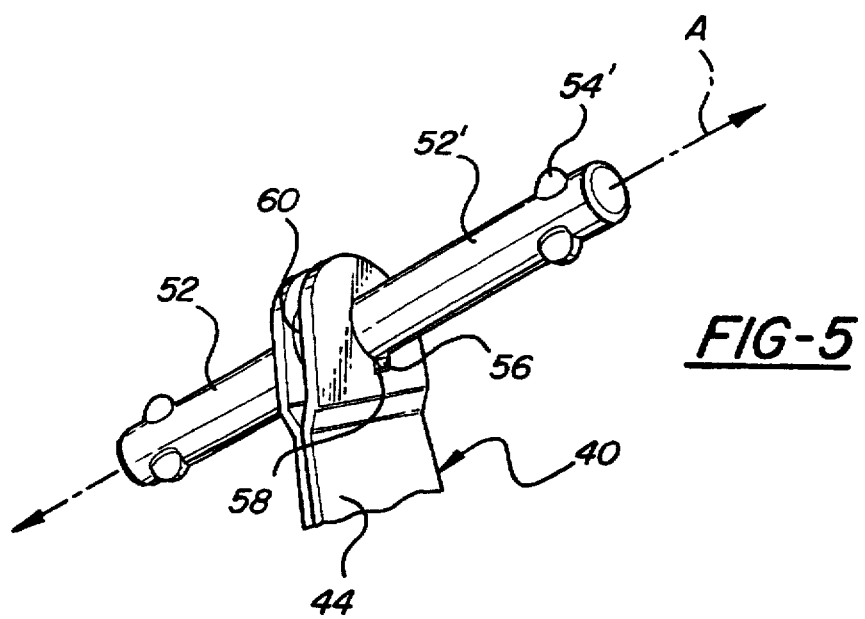

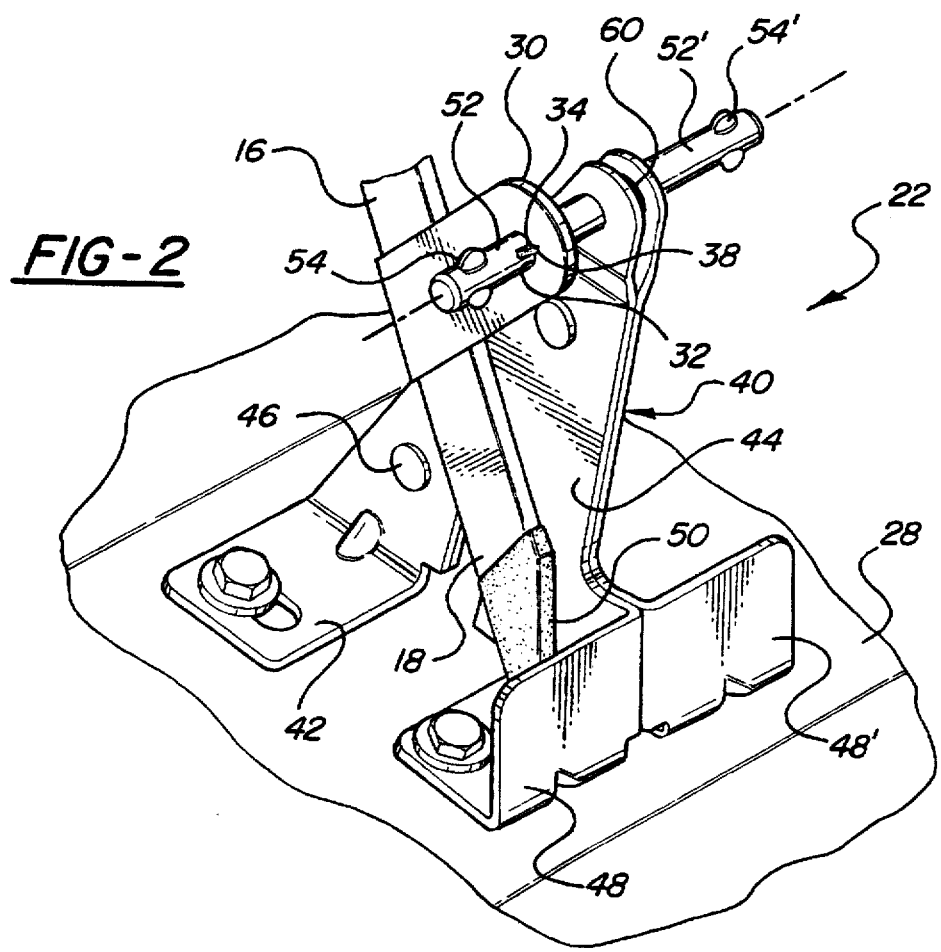
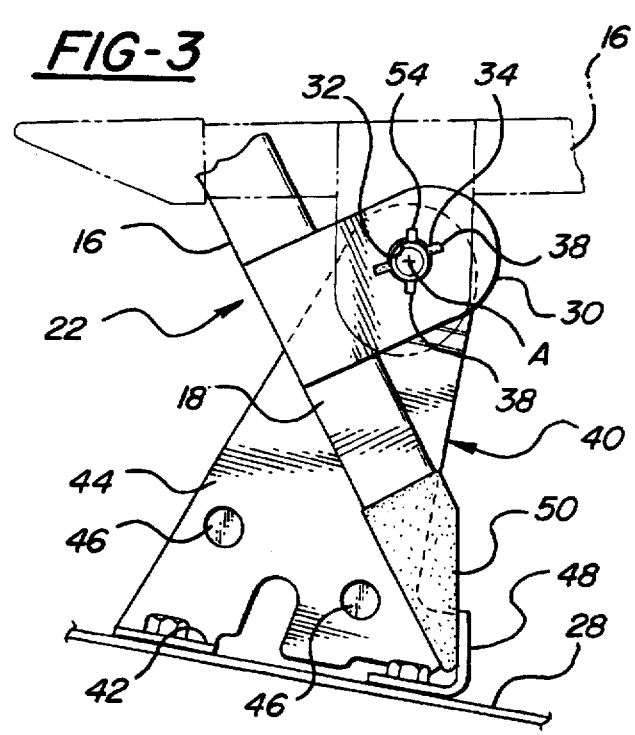
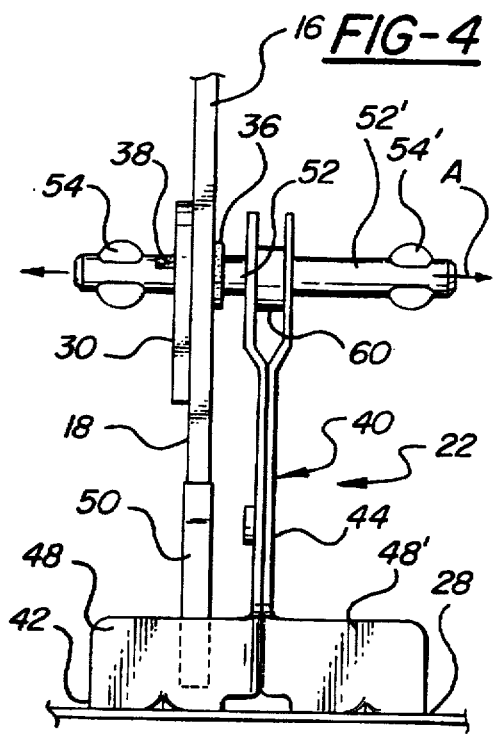

RETENTION FOR VEHICLE SEAT AND METHOD OF ASSEMBLY

BACKGROUND OF THE INVENTION

1. Field of the Invention

The subject invention pertains to a folding backrest for a passenger seat assembly in a motor vehicle, and more particularly toward an improved seat retention therefor.

2. Description of Related Art

A folding backrest for a passenger seat assembly in a motor vehicle is often designed with both safety and ease of installation in mind. With regard to the installation issues, it is desirable in many vehicle types to attach a floor bracket having a horizontally extending hinge pin to the floor in the passenger compartment. The seat assembly, having a pivot bearing in one end thereof, is then slid onto the hinge pin and a hinge mechanism at its other end is secured to the floor. In this manner, the backrest may be swung between upright use and prone folded positions. This installation procedure is quick and convenient to the assembly line workers.

However, it has been discovered that the hinge arrangement described above may tend to disconnect under very high impact loads if the backrest frame bends and therewith pulls its one end off the hinge pin. Although highly unlikely, if this were to occur the backrest portion may become unsecured to the floor in the passenger compartment and result in injury to the seat occupants.

SUMMARY OF THE INVENTION

The subject invention comprises a folding backrest for a passenger seat assembly in a motor vehicle. The assembly comprises a backrest frame having a first end and a second end. A first hinge is operatively associated with the first end of the backrest frame and a second hinge operatively associated with the second end of the backrest frame. The first and second hinges pivotally support the backrest frame about an imaginary horizontal folding axis for movement between an upright use position and a prone folded position. The first hinge includes a pivot bearing centered along the folding axis and a hinge pin operatively pivotally disposed in the pivot bearing. The hinge pin includes a keyed tip and the pivot bearing includes a keyway aligned and registerable with the keyed tip when the backrest frame is adjacent the folded position to permit axial sliding connection between the two members during the assembly process. The keyed tip and the keyway are rotated out of registry with one another when the backrest frame is in the use position to prevent disassembly in the event of high impact forces.

The subject invention also contemplates a method for installing a folding backrest portion of a passenger seat assembly in a motor vehicle, the method comprising the steps of: providing a backrest frame having a first end and a second end; forming a pivot bearing in the first end of the backrest; forming a keyway in the pivot bearing; pivotally connecting a second hinge to the second end of the backrest frame; attaching a floor bracket having a perpendicularly extending hinge pin to the floor in the passenger compartment of a motor vehicle, the hinge pin including a keyed tip having a shape complimentary to the keyway of the pivot bearing; folding the backrest frame to a generally horizontal position to align the keyed tip of the hinge pin with the keyway of the pivot bearing, and then axially sliding the hinge pin into the pivot bearing; and finally attaching the second hinge to the floor in the passenger compartment.

The keyed tip of the hinge pin and the keyway in the pivot bearing prevents the pivot bearing from pulling off the hinge pin in the event of severe bending forces placed on the backrest frame. Therefore, if the backrest frame bends under high impact loads and therewith pulls its first end against the hinge pin, it will not disconnect when the backrest portion is in the use position (the only position in which an occupant may be present) because the keyed tip and the keyway are not aligned with one another. Hence, the backrest portion will remain secured to the floor in the passenger compartment and further protect the seat occupants from injury.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is perspective view of a 60/40 split backrest assembly according to the subject invention, and showing the seat cushion portion in phantom;

FIG. 2 is a perspective view of the first hinge and the first end of the backrest frame in the use position;

FIG. 3 is a side view of the first hinge and backrest frame as shown in FIG. 2, and with the backrest frame pivoted to its folded position in phantom;

FIG. 4 is a front view of the first hinge and backrest frame taken along lines 4—4 of FIG. 3; and FIG. 5 is a perspective view showing the central flange of the hinge pin trapped between the right and left half sections of the floor bracket and an anti-rotation lug of the hinge pin seated in a receptacle of the floor bracket.

DESCRIPTION OF THE PREFERRED EMBODIMENT

Referring to the Figures, wherein like numerals indicate like or corresponding parts throughout the several views, a folding passenger seat assembly for a motor vehicle is generally shown at 10 in FIG. 1. The folding passenger seat assembly 10 includes a seat portion, shown in phantom at 12, and a backrest portion, generally indicated at 14. The backrest portion 14 is composed of a structural backrest frame 16 encased in a foam and trim covering. The backrest frame 16 has a first end 18 and a second end 20, with the first end 18 comprising the inside edge and the second end 20 comprising the outside edge. As shown in FIG. 1, the backrest portion 14 is preferably of the so-called 60/40 split type including a companion backrest portion 14' of shorter length which can be independently manipulated. Alternatively, the backrest portion 14 may be of the traditional full length one piece bench-type or bucket-type (not shown), in which the backrest portion is coextensive with the seat portion.

A first hinge, generally indicated at 22, is operatively associated with the first end 18 of the backrest frame 16 and a second hinge 24 is operatively associated with the second end 20 of the backrest frame 16. The first 22 and second 24 hinges pivotally support the backrest frame 16 relative to the seat portion 12 about an imaginary horizontal folding axis A for movement between an upright use position and a prone folded position. The second hinge 24 is adapted to be fastened by threaded fasteners or the like (not shown) directly to the floor 28 or other structural surface in the passenger compartment of the motor vehicle. Preferably, the second hinge 24 is of the latching type which can be actuated by a remote lever 26.

The first end 18 of the backrest frame 16 includes a tab 30 welded thereto and extending in the forward direction of the vehicle. The tab 30 is formed with a hole therein comprising a pivot bearing 32 centered along the folding axis A. The pivot bearing 32 has a generally circular periphery, but is provided with a pair of diametrically opposed notches radiating from the periphery which together comprise a keyway 34. A plastic bushing 36 is retained in the tab 30. The bushing 36 includes two self-locking tangs 38 which pass through the notches of the keyway 34 and hook behind the tab 30.

The first hinge 22 includes a floor bracket, generally indicated at 40, having a base portion 42 and a center portion 44. Preferably, the floor bracket 40 is comprised of a stamped metal right half section and a mirror-image stamped metal left half section fixedly attached to the right half section by rivets 46 or other suitable fasteners. A bent stop plate 48 adjoins the base 42 and center 44 portions for creating an integral pivot stop for a distal tip 50 of the backrest frame 16 when in the use position, as shown in FIGS. 3 and 4.

The first hinge 22 includes a hinge pin 52 operatively pivotally disposed in the pivot bearing 32. The hinge pin 32 extends perpendicularly from the center portion 44 of the floor bracket 40 to pivotally support the first end 18 of the backrest frame 16. The hinge pin 52 is relatively long to accommodate positioning and tolerancing variations in the seat assembly 10 and the motor vehicle, and to facilitate the assembly process as described below. The bushing 36 helps dampen vibrations between the hinge pin 52 and the pivot bearing 32, as well as provide a smooth and durable journal seat.

The hinge pin 52 includes a pair of diametrically opposed wings together comprising a keyed tip 54. The keyed tip 54 has a cross-sectional size and shape complimentary to the keyway 34 of the pivot bearing 32 so that the male hinge pin 52 may slide axially into the female pivot bearing 32. However, the generally vertical orientation of the wings of the keyed tip 54 only align with the notches of the keyway 34 when the backrest frame 16 is in (or near) the folded position, as shown in phantom in FIG. 3. Therefore, during the assembly process, the keyed tip 54 and the keyway 34 must first be rotated into registry with one another by placing the backrest portion 14 in the horizontal folded position, prior to axially sliding the backrest portion 14 onto the first hinge 22. Then, the second hinge 24 is attached to the floor 28. As the backrest portion 14 is moved to its use position, the keyed tip 54 and the keyway 34 rotate out of registry with one another, which prevents the pivot bearing 32 from pulling off the hinge pin 52 in the event of severe bending forces placed on the backrest frame 16.

Those skilled in the art will appreciate that the keyed tip 54 and keyway 34 need not of necessity be integrated with the first hinge 22. Instead, it is possible to locate the keyed tip 54 and keyway 34 laterally from the folding axis A, with an arcuate slot or other such arrangement being provided for lost motion as the backrest portion 14 travels between its use and folded positions.

In the preferred embodiment, the first hinge 22 also pivotally supports the one interior end of the companion backrest portion 14'. Accordingly, the companion backrest portion 14' is independently pivotally supported on its own hinge pin 52' about the folding axis A for movement between a use position and a folded position. The structural features of the companion first hinge 22' are referenced n the figures with corresponding referenced numbers and the added prime designation. Of course, those skilled in the art will appreciate that the one first hinge 22 need not be united for common use by both backrest portions 14, 14', but rather independent hinges can be employed if the backrest is to remain of the split type.

The hinge pin 52 includes a lug 56 and the center portion 44 of the floor bracket 40 includes a receptacle 58 for non-rotatably receiving the lug 56. The lug 56 and receptacle 58 ensure proper polarization of the keyed tip 54 so that the keyed tip 54 and keyway 34 align when the backrest portion 14 is at or near the folded position. The hinge pin 52 also includes a central flange 60 which is trapped between the right and left half sections of the floor bracket 40 to further enhance stability.

A method for installing the folding backrest portion 14 of the passenger seat assembly 10 in a motor vehicle includes the steps of providing the backrest frame 16 having its first end 18 and its second end 20; forming the pivot bearing 32 in the first end 18 of the backrest 16, and forming the keyway 34 in the pivot bearing 32; pivotally connecting the second hinge 24 to the second end 20 of the backrest frame 16; trapping the central flange 60 of the hinge pin 52 between right and left half sections of the floor bracket 40 so that the hinge pin 52 extends perpendicularly, with the hinge pin 52 including a keyed tip 54 having a shape complimentary to the keyway 34 of the pivot bearing 32; preventing relative rotation between the hinge pin 52 and the floor bracket 40 via a lug 56 and receptacle 58 an arrangement; attaching the floor bracket 40 to the floor 28 in the passenger compartment of the motor vehicle; folding the backrest frame 16 to a generally horizontal position to align the keyed tip 54 of the hinge pin 52 with the keyway 34 of the pivot bearing 32; axially sliding the hinge pin 52 into the pivot bearing 32 while dampening vibrations between the hinge pin 52 and the pivot bearing 32; and finally attaching the second hinge 24 to the floor 28 in the passenger compartment.

The subject increases the ability of the seat assembly 10 to safely withstand impact forces because the keyed tip 54 of the hinge pin 52 and the keyway 34 in the pivot bearing 32 prevent the pivot bearing 32 from pulling off the hinge pin 52 in the event of severe bending forces placed on the backrest frame 16. Therefore, if the backrest frame 16 bends under high impact loads and therewith pulls its first end 16 against the hinge pin 52, it will not disconnect when the backrest portion 14 is in the use position (the only position in which an occupant may be present) because the keyed tip 54 and the keyway 34 are not aligned with one another. Hence, the backrest portion 14 will remain secured to the floor 28 in the passenger compartment and further protect the seat occupants from injury.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A folding backrest for a passenger seat assembly in a motor vehicle, said assembly comprising: a backrest frame having a first end and a second end; a first hinge operatively associated with said first end of said backrest frame and a second hinge operatively associated with said second end of said backrest frame, said first and second hinges pivotally supporting said backrest frame about an imaginary horizontal folding axis for movement between a use position and a folded position; said first hinge including a pivot bearing centered along said folding axis and a hinge pin operatively pivotally disposed in said pivot bearing; said hinge pin including a keyed tip and said pivot bearing including a keyway aligned and registerable with said keyed tip when said backrest frame is adjacent said folded position to permit axial sliding connection therebetween during the assembly process and whereby said keyed tip and said keyway are rotated out of registry with one another when said backrest frame is in said use position to prevent disassembly therebetween.

2. An assembly as set forth in claim 1 wherein said keyed tip includes a pair of diametrically opposed wings, and wherein said pivot bearing has a generally circular periphery, said keyway including a pair of diametrically opposed notches extending from said periphery.

3. An assembly as set forth in claim 1 wherein said first hinge includes a floor bracket having a base portion and a center portion, said hinge pin extending perpendicularly from said center portion.

4. An assembly as set forth in claim 3 wherein said hinge pin includes a lug and said center portion of said floor bracket includes a receptacle for non-rotatably receiving said lug.

5. An assembly as set forth in claim 1 wherein said pivot bearing is disposed in said first end of said backrest frame.

6. An assembly as set forth in claim 5 wherein said first end of said backrest frame includes a tab, said pivot bearing being disposed in said tab.

7. An assembly as set forth in claim 6 wherein said first hinge includes a bushing interposed between said tab and said hinge pin.

8. An assembly as set forth in claim 7 herein said bushing includes at least one self-locking tang for engaging said tab.

9. An assembly as set forth in claim 1 wherein said floor bracket includes a right half section and a left half section fixedly attached to said right half section, said hinge pin including a central flange trapped between said right and left half sections.

10. An assembly as set forth in claim 1 wherein said first hinge includes a bushing interposed between said first end of said backrest frame and said hinge pin.

11. A folding backrest for a passenger seat assembly in a motor vehicle, said assembly comprising: a backrest frame having a first end and a second end; a first hinge operatively associated with said first end of said backrest frame and a second hinge operatively associated with said second end of said backrest frame, said first and second hinges pivotally supporting said backrest frame about an imaginary horizontal folding axis for movement between a use position and a folded position; said first end of said backrest frame including a pivot bearing centered along said folding axis; said first hinge including a floor bracket having a base portion and a center portion; a hinge pin extending perpendicularly from said center portion and operatively pivotally disposed in said pivot bearing; a keyed tip extending from one of said first end of said backrest frame and said floor bracket; and a keyway disposed in the other of said first end of said backrest frame and said floor bracket, said keyway aligned and registerable with said keyed tip when said backrest frame is adjacent said folded position to permit axial sliding connection therebetween during the assembly process and whereby said keyed tip and said keyway are rotated out of registry with one another when said backrest frame is in said use position to prevent disassembly therebetween.

12. An assembly as set forth in claim 11 wherein said keyed tip extends from said floor bracket and said keyway is disposed in said first end of said backrest frame.

13. An assembly as set forth in claim 12 wherein said keyed tip is disposed on said hinge pin and said keyway is disposed in said pivot bearing.

14. An assembly as set forth in claim 13 wherein said pivot bearing has a generally circular periphery, said keyed tip including a pair of diametrically opposed wings and said keyway including a pair of diametrically opposed notches extending from said periphery.

15. A method for installing a folding backrest portion of a passenger seat assembly in a motor vehicle, said method comprising the steps of: providing a backrest frame having a first end and a second end; forming a pivot bearing in the first end of the backrest frame; forming a keyway in the pivot bearing; pivotally connecting a second hinge to the second end of the backrest frame; fastening a perpendicularly extending hinge pin to a floor bracket; forming a keyed tip having a shape complimentary to the keyway of the pivot bearing on the hinge pin; attaching the floor bracket to the floor in the passenger compartment of a motor vehicle; folding the backrest frame to a generally horizontal position to align the keyed tip of the hinge pin with the keyway of the pivot bearing, and then axially sliding the hinge pin into the pivot bearing; and attaching the second hinge to the floor in the passenger compartment.

16. A method as set forth in claim 15 further including the step of trapping a central flange of the hinge pin between a right half section and a left half section of the floor bracket.

17. A method as set forth in claim 15 further including the step of mechanically interlocking the hinge pin and the floor bracket for preventing relative rotation therebetween.

18. A method as set forth in claim 15 further including the step of interposing a bushing between the hinge pin and the pivot bearing for dampening vibrations.

19. A method as set forth in claim 15 wherein said step of forming the keyed tip on the hinge pin is performed after said step of fastening the hinge pin to the floor bracket.

* * * * *

UNITED STATES PATENT AND TRADEMARK OFFICE
CERTIFICATE OF CORRECTION

PATENT NO. : 5,700,058

DATED : December 23, 1997

INVENTOR(S) : Ravichandran Balagurumurthy and Jon W. Kinsey

It is certified that error appears in the above-identified patent and that said Letters Patent is hereby corrected as shown below:

Column 5, Claim 1, Line 9, after "pivot", change "beating" to -- bearing --.

Column 5, Claim 8, Line 1, after "7", change "herein" to -- wherein --.

Column 5, Claim 11, Line 10, after "pivot", change "beating" to -- bearing --.

Signed and Sealed this

Fourteenth Day of July, 1998

Attest:

BRUCE LEHMAN

Attesting Officer

Commissioner of Patents and Trademarks